US006731456B2

United States Patent
Parsoneault et al.

(10) Patent No.: US 6,731,456 B2
(45) Date of Patent: May 4, 2004

(54) FLUID DYNAMIC BEARING THERMAL COMPENSATION

(75) Inventors: Norbert Steven Parsoneault, Scotts Valley, CA (US); Troy Michael Herndon, San Jose, CA (US); Robert Alan Nottingham, Santa Cruz, CA (US); Jeffry Arnold LeBlanc, Aptos, CA (US); Alan Lydon Grantz, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 120 days.

(21) Appl. No.: 10/095,796

(22) Filed: Mar. 11, 2002

(65) Prior Publication Data

US 2003/0081351 A1 May 1, 2003

Related U.S. Application Data

(60) Provisional application No. 60/350,314, filed on Oct. 26, 2001.

(51) Int. Cl.$^7$ .............................. G11B 17/02; H02K 5/16
(52) U.S. Cl. ............................ 360/99.08; 360/98.07; 310/90; 384/110; 384/905
(58) Field of Search ........................ 360/98.07, 99.04, 360/99.08; 310/90; 369/258; 384/110, 905

(56) References Cited

U.S. PATENT DOCUMENTS

| | | | | |
|---|---|---|---|---|
| 5,448,120 A | * | 9/1995 | Schaule et al. ............... | 310/90 |
| 5,697,708 A | | 12/1997 | Leuthold et al. ............. | 384/110 |
| RE36,931 E | * | 10/2000 | Grantz et al. ................ | 360/99.08 |
| 6,149,161 A | * | 11/2000 | Grantz et al. ................ | 277/427 |
| 6,154,339 A | * | 11/2000 | Grantz et al. ................ | 360/99.08 |
| 6,394,654 B1 | * | 5/2002 | Khan et al. ................... | 384/114 |
| 6,502,991 B2 | * | 1/2003 | Knepper et al. ............. | 384/110 |
| 6,524,451 B1 | * | 2/2003 | Cochran ....................... | 204/228.3 |
| 6,575,634 B2 | * | 6/2003 | Nottingham ................. | 384/110 |
| 2002/0074222 A1 | * | 6/2002 | Cochran ....................... | 204/224 M |
| 2002/0113507 A1 | * | 8/2002 | Nottingham et al. ........ | 310/90 |

FOREIGN PATENT DOCUMENTS

| | | | |
|---|---|---|---|
| JP | 10-47342 A | * | 2/1998 |
| JP | 2000224891 | | 1/1999 |
| JP | 2003-49829 A | * | 2/2003 |
| WO | PCT/US 02/34644 | | 10/2002 |

* cited by examiner

*Primary Examiner*—Jefferson Evans
(74) *Attorney, Agent, or Firm*—Moser Patterson & Sheridan

(57) ABSTRACT

A hub and shaft are provided which are mounted for relative rotation by providing two conical bearings spaced apart along the shaft, and a bearing seat facing each conical bearing. Fluid is maintained in the gap between each cone and the facing bearing seat, supporting the cone and seat for relative rotation. The outer surface of the bearing seat is insulated from the remainder of the motor by a thermal insulator which extends at least part way along the outer surface of the seats. This insulator is effective at keeping the bearings warm even in a relatively low temperature environment in which the motor may be used. The insulator may comprise a cylindrical ceramic or similar low thermal conductivity material extending at least part way along the axial distance outside of the bearing cones. Alternatively, an air space may be defined in the outer surface of the bearing seat, extending at least part way between the bearing cones.

20 Claims, 4 Drawing Sheets

FLUID DYNAMIC BEARING THERMAL COMPENSATION

CROSS-REFERENCE TO RELATED APPLICATIONS

This application claims benefit of United States provisional patent application entitled, "Fluid Dynamic Bearing Thermal Compensation", invented by Parsoneault et al and assigned application serial No. 60/350,314, filed Oct. 26, 2001.

BACKGROUND OF THE INVENTION

1. Field of the Invention

The present invention relates to the field of hydrodynamic bearing assemblies of the type, which provides support and rotation for a high-speed spindle element. More specifically, the present invention relates to an improved apparatus for reducing variations in spindle stiffness and power as a function of temperature.

2. Background of the Invention

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm, which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor, which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways transmit this surface structure as well as their imperfection in sphericity in the form of vibration to the rotating disc. This vibration results in misalignment between the data tracks and the read/write transducer. This source of vibration limits the data track density and the overall performance of the disc drive system.

Another problem is related to the application of hard disc drives in portable computer equipment, resulting in severely increased requirements for shock resistance. Shocks create relative acceleration between the discs and the drive casing, which in turn show up as a force across the bearing system. Since the contact surfaces in ball bearings are very small, the resulting contact pressures may exceed the yield strength of the bearing material, and create long-term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferromagnetic fluids or even air have been utilized in hydrodynamic bearing systems. The reason for the desirability of the use of air is the importance of avoiding the outgassing of contaminants into the sealed area of the head/disc housing. However, air does not provide the lubricating qualities of oil. The relatively higher viscosity of oil allows for larger bearing gaps and therefore looser tolerance standards to achieve similar dynamic performance.

A common type of fluid dynamic bearing comprises a shaft extending through the sleeve or hub with one or more radially extending plates supported from the shaft. A fluid dynamic bearing is provided between the shaft and the bore through the hub, with the fluid, which occupies the gap between the inner surface of the bore and the outer surface of the shaft providing the stiffness for the shaft. Without this stiffness, the shaft is prone to tilting or wobbling over the life of the motor. As a result, any hub or disc supported for rotation by the shaft is prone to wobbling or tilting. Any such tilting or instability in the hub or disc would make reading or writing of data on the disc surface very difficult, and diminish the life of the motor and the disc drive in which it is used.

However, the very fact that a conventional fluid dynamic bearing design relies on the use of a fluid in a very narrow gap between a shaft and surrounding bore for establishing and maintaining radial stiffness creates a problem due to the substantial range of temperatures over which the motor must operate. In known journal bearing designs for the shaft, the temperature of the fluid when the system is at rest may be about 5° C.–25° C. depending on the temperature of the surrounding environment; in operation, the fluid temperature can be 70° C. or more. Clearly, the viscosity of the fluid will change with the fluid becoming less dense and providing substantially less stiffness for the shaft. Thus, unless elaborate systems are incorporated into the design, it is very difficult to maintain the desired level of radial stiffness for the shaft over the entire range of operating temperatures of the disc drive.

Efforts have been made to modify the fluid used in the fluid dynamic bearing gap to minimize the changes in viscosity with changes in temperature; but such fluids can add to the cost of the bearing and motor, and have not fully achieved the goal of temperature compensation over a wide range of temperatures.

Disc drive speeds continue to increase due to obvious benefits in performance. Higher speeds usually means higher power requirements, but every effort is made to avoid increases in power due to power supply limitations and excessive heat that is generated. As a result of these constraints, high speed spindles need to be exceptionally efficient at all temperatures. Fluid dynamic motors tend to have high power requirements at low ambient temperature due to change in viscosity of oil. The resultant low temp power demand is often excessive so much attention has been devoted to reducing this low temperature power requirement.

SUMMARY OF THE INVENTION

It is therefore an objective of the present invention to provide a hydrodynamic bearing design, which is simple and reliable in design, while incorporating means for compensating for temperature variations while maintaining the radial stiffness of the system.

It is a further objective of the invention to provide a fluid dynamic bearing design which minimizes the changes in power consumption during long-term operation.

Another objective of the invention is to provide a design wherein the high speed spindle is very efficient at all operating temperatures.

The present invention is also intended to achieve a minimization in the variation in steady state run current between different operating temperatures.

These and other objectives of the invention are achieved by providing a insulator between at least a portion of the sleeve or bearing seat which surrounds the fluid dynamic bearing, and the hub and surrounding environment in which the bearing, typically a spindle motor operates.

More particularly, according to a preferred design of the present invention, a hub and shaft are provided which are mounted for relative rotation by providing two conical bearings spaced apart along the shaft, and a bearing seat facing each conical bearing. Fluid is maintained in the gap between each cone and the facing bearing seat, supporting the cone and seat for relative rotation. The outer surface of the bearing seat is insulated from the remainder of the motor by a thermal insulator which extends at least part way along the outer surface of the seats. This insulator is effective at keeping the bearings warm even in a relatively low temperature environment in which the motor may be used. The insulator may comprise a cylindrical ceramic or similar low thermal conductivity material extending at least part way along the axial distance outside of the bearing cones. In an alternative embodiment, an air space may be defined in the outer surface of the bearing seat, extending at least part way between the bearing cones.

The embodiments described above comprise means for insulating the bearings from the remainder of the surrounding motor, keeping the bearings warm even in a low temperature environment and causing the bearings to heat up more quickly by a reduction in the thermal mass ie, the area around the bearings which may heat up.

Because the reduction in thermal mass is recognized herein as having beneficial effects, it is also possible to use ceramic for the male cone which is mounted on the shaft; the female cone or bearing seat which surrounds the cone on the shaft; and potentially the shaft itself to reduce the thermal mass further.

Other features and advantages of this invention may be apparent to a person of skill in the art who studies the following description of a preferred embodiment given with reference to the attached drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The following description of a preferred embodiment of the invention is given with reference to its use in a disc drive, since disc drives are especially sensitive to increases in variations or increases in the use in drive current. However, the present invention may be also be useful in improving the operability of fluid dynamic bearings, especially conical fluid dynamic bearings, used in other circumstances.

Figure 1:
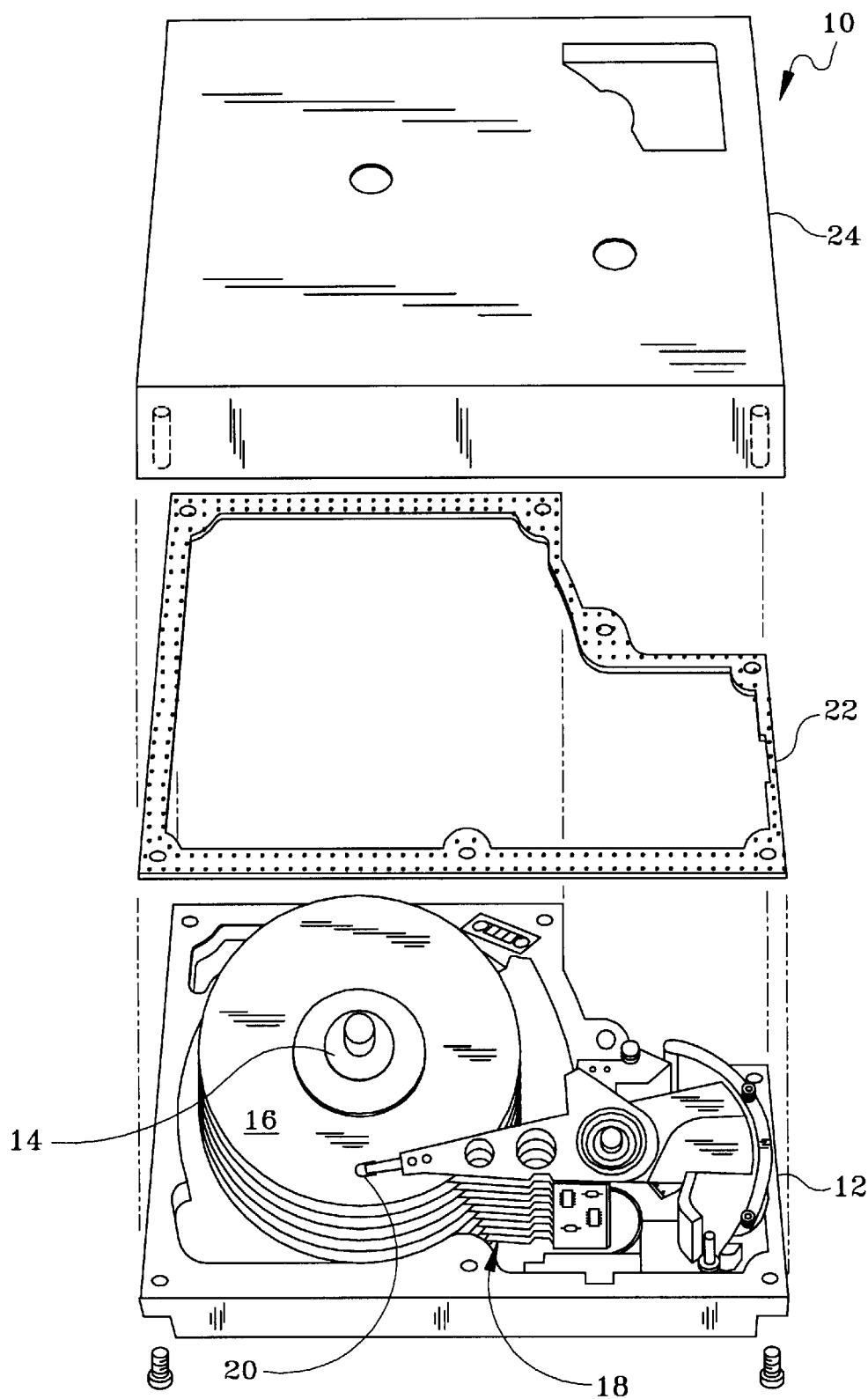
FIG. 1 is a perspective view of a disc drive in which the motor of the present invention is especially useful.

Thus, FIG. 1 shows an exploded perspective view of a disc drive storage system in which the present bearing and/or motor would be useful. FIG. 1 is provided primarily to give an illustrative example of the environment in which a motor incorporating the bearing comprising the features of the present invention is used; clearly, the motor could be used equally well in other designs of disc drives, or other operating environments apart from disc drive technology where minimization in variations of run current over the operating ambient temperatures, and/or minimization of the amount of power required to start and reliably maintain the speed of the motor, and/or maintenance of the stiffness of the shaft against radial stability over a wide range of operating temperatures is important.

In the particular example of FIG. 1, the storage system 10 includes a housing 12 having a spindle motor 14, which rotatably carries the storage disc or discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a set of radially differentiated tracks on the surface of the discs 16. This allows the transducers to read and write encoded information on the surface of the discs at selected locations. The discs rotate at very high speed, several thousand rpm, in order to maintain each transducer flying over the surface of the associated disc. In present day technology, the spacing distance between the transducer and the rotating disc surface is measured in micro-inches; thus, it is essential that the disc does not vibrate or tilt away from the plane in which it is designed to rotate. Such, tilting, displacement or vibration could easily disturb the air flow, which is maintaining the flight of the transducer over the surface, or simply cause mechanical contact between the transducer and the disc surface. Such contact would probably damage the disc surface, resulting in the loss of disc storage space. It could even damage the transducer, resulting in loss of use of the disc drive. Maintenance of the constant speed of rotation of the disc, with minimum power consumption, is also important.

Figure 2:
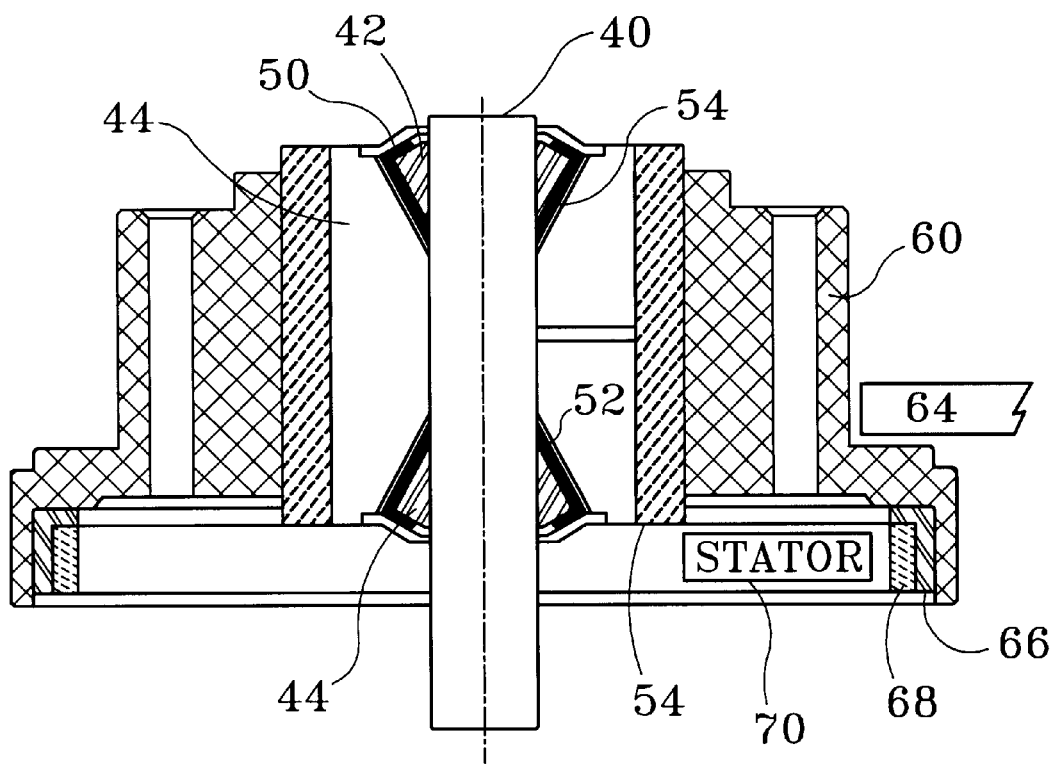
FIG. 2 is a vertical sectional view of a motor having dual conical bearings for supporting the shaft and hub for relative rotation which may be adapted to incorporate features of the present invention.

FIG. 2 is a vertical section through a spindle motor of a type useful in the disc drive of FIG. 1 showing the basic structure of the motor or at least so much as is relevant to this invention. The motor as shown in part comprises a stationery shaft 40 supported by spaced bearing cones 42, 44 which are supported from the shaft. A bearing seat or seats 44 is provided. The bearing seat 44 provides the cooperative surface with the bearing cones 42 and 44 to support relative rotation of the hub and the shaft, utilizing the fluid 50 in the gaps 52 and 54 between the faces of the seat.

Immediately outside of the bearing seat 44 is a sleeve 54 of a low thermal conductivity material. In a preferred form of the invention, this material is ceramic. This sleeve comprises a ceramic thermal insulator 54 which is effective at keeping the bearings warm even in a low temperature environment which may go to 5° C. or below. Immediately outside of the sleeve 54 of low thermal conductivity material is a hub 60 which is typically formed of aluminum, the outer surface of the hub supporting one or more discs 64 for high speed constant rotation. This same outer hub supports a back iron 66 and magnet 68 which would be aligned with stator 70 to cause rotation in response to current signals, as is well known.

Because motor drag reduces sharply with higher ambient temperature, the insulating sleeve 54 will have little effect on the operation of the relatively rotating parts as ambient temperature increases. This is desirable because at high ambient temperature, increased bearing temperature reduces stiffness below that which is required. However, it is believed that the use of this sleeve will have minimal effect on the stiffness of the shaft sleeve combination. Anyway in which the thermal mass (the area around the bearings which may heat up) may be reduced or isolated from the surroundings will improve the self-heating effect. This is the benefit which is provided by utilizing this sleeve of low thermal conductivity material.

Figure 3:
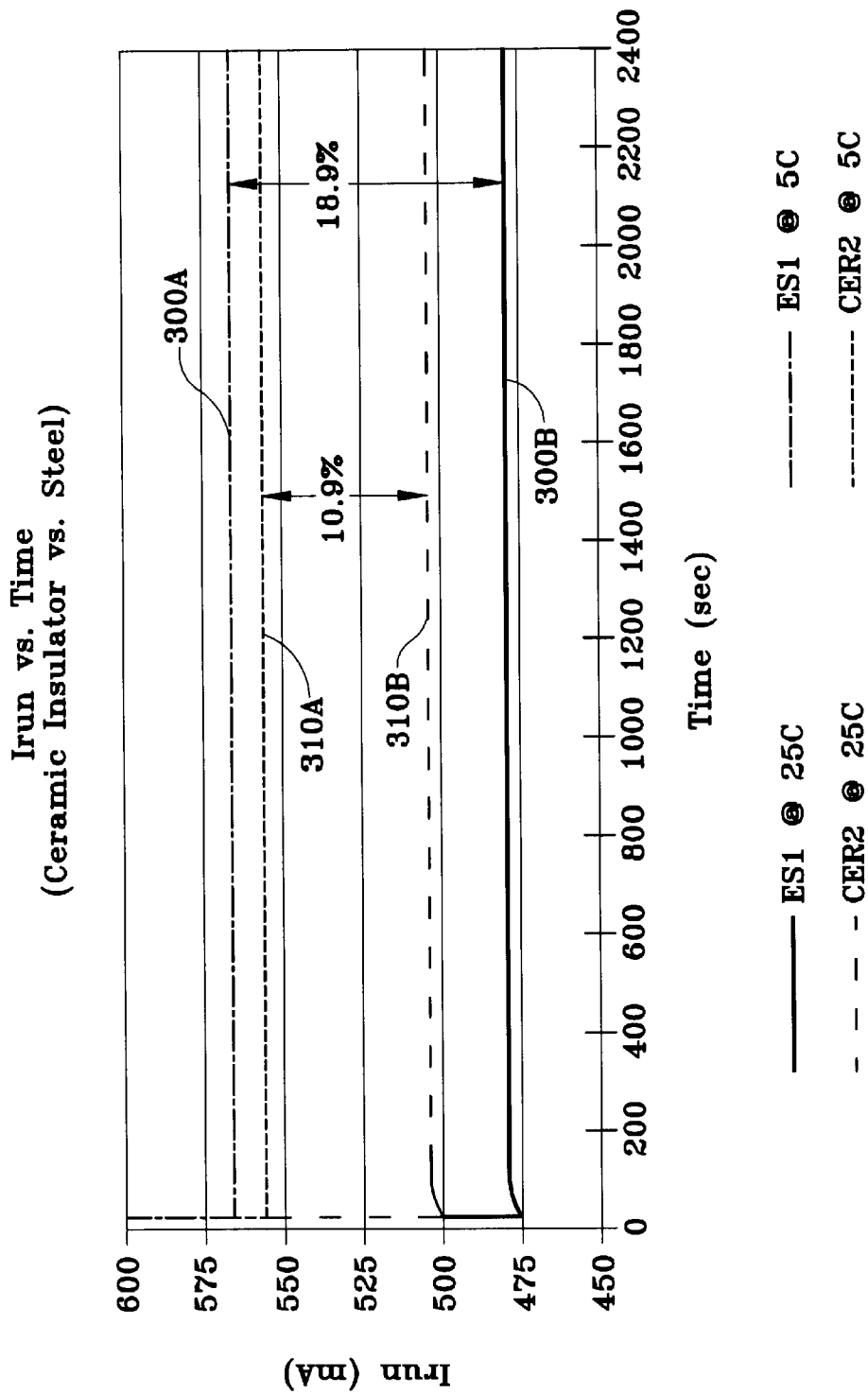
FIG. 3 is a graph of run current versus temperature.

FIG. 3 illustrates the change in run current (Irun) versus temperature for the motor style shown in FIG. 2, measured both with and without the presence of the ceramic sleeve 54. The figure comprises four lines; line 300A shows the motor design operating in a 5° C. ambient and the current which the motor draws for sustained operation; line 300B shows the same stainless steel motor with a substantially lower run current, that is, the run current reduced by 18.9% for operation at 25° C.

In contrast, with the use of the ceramic sleeve, as shown in FIG. 2, in contrast, with the ceramic sleeve in place, the different in one current between 5° C. operation (line 310A) and 25° C. operation, (line 310B), the difference is only 10.9%, which is a highly advantageous diminution of the difference in steady state run current with differences in ambient temperature. As set forth in the problem statement above, this is considered a highly material modification of previously achieved differences in run current, relative to prior art approaches.

Figure 4:
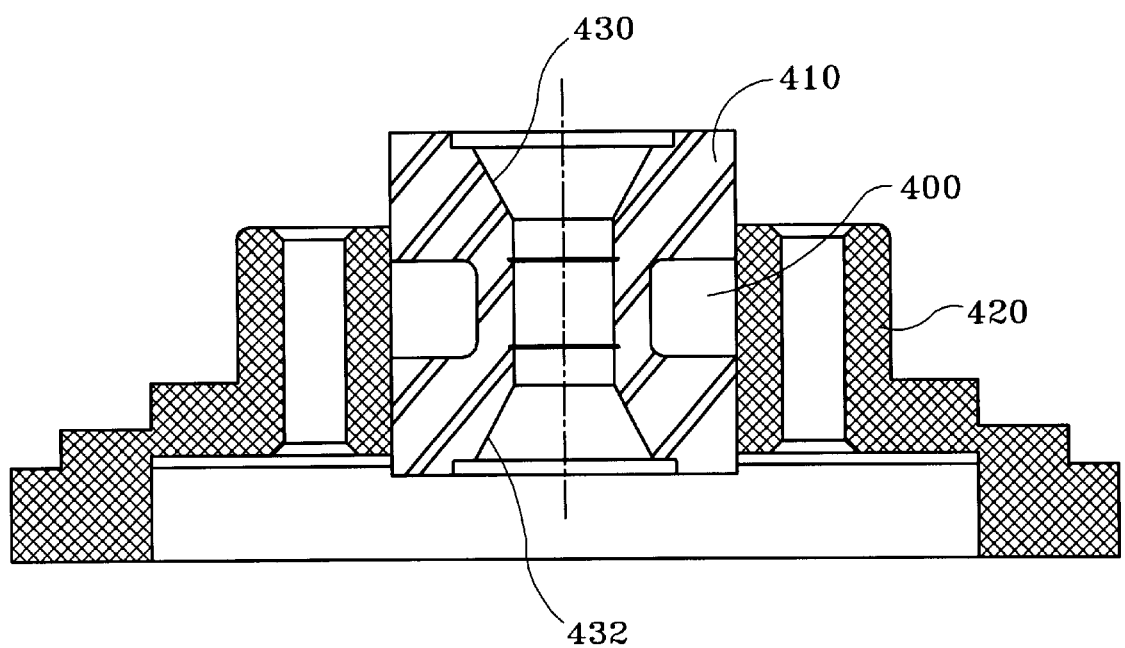
FIG. 4 is a vertical sectional view of a further alternative embodiment of the present invention.

An alternative approach is shown in FIG. 4; as compared to FIG. 2, the male cones and shaft of the conical bearings are not evident in this view; only the bearing seat. In the embodiment of FIG. 4, rather than use a ceramic sleeve as shown in FIG. 2, an air gap 400 is defined in the outer surface of the sleeve 410. This air gap occupies the maximum amount of space in the radial direction which is possible to be used without weakening of the structure of the sleeve, and extends in this exemplary embodiment about from the center line of the sleeve to the outside edge of the sleeve where the hub 420 is attached. The axial extent of the air gap is also extend as far as possible consistent with structural integrity; in this embodiment, it extends a substantial portion of the axial distance between the two female cones 430, and 432 defined in the sleeve 410. It is known that air has a very low thermal transfer characteristic, and thus this embodiment, comprising a properly defined air gap 400 also provides the benefits of thermal insulation, as can be achieved with ceramic thermal insulator.

Some benefits above described approach may also be achieved by substituting ceramic for the male cones shown in FIG. 2; for the bearing seats which define the female cones; and/or for the shaft. In addition, there may be other materials that may be used with low thermal conductivity such as engineering plastics, especially for the ceramic ring. Other features and advantages of the invention to a person who is skilled in the art who studies this invention disclosure. Therefore, the scope of the present invention is to be found in the following claims.

What is claimed is:

1. A fluid dynamic bearing supporting a sleeve and shaft for relative rotation, the shaft having a pair of cones separated along the shaft, the sleeve comprising a pair of bearing seats, one of the seats cooperating with each of the cones to define a gap between the cone and the seat, fluid in the gap supporting the sleeve and shaft for relative rotation, and a region of low thermal conductivity on an outer surface of the sleeve for providing thermal insulation for the shaft and the sleeve to keep the fluid dynamic bearing warm even in a low temperature environment.

2. A fluid dynamic bearing as claimed in claim 1 wherein the region of low thermal conductivity comprises a circumferential ceramic layer.

3. A fluid dynamic bearing as claimed in claim 1 wherein the sleeve comprises stainless steel and the shaft comprises stainless steel.

4. A fluid dynamic bearing as claimed in claim 1 wherein the thermal insulating region comprises an air gap extending radially and axially along an outer surface of the sleeve.

5. A fluid dynamic bearing as claimed in claim 4 wherein the air gap extends axially along a region between the bearing seats and the cones, but not radially overlapping the region of the bearing seats and the cones.

6. A fluid dynamic bearing as claimed in claim 4 wherein the bearing seat comprises stainless steel, and the hub comprises aluminum.

7. A fluid dynamic bearing as claimed in claim 4 wherein the sleeve comprises stainless steel and the shaft comprises stainless steel.

8. A fluid dynamic bearing as claimed in claim 1 wherein the region of low thermal conductivity comprises a cylindrical shield comprising engineering plastic.

9. A spindle motor for use in a disc drive, comprising a shaft and a sleeve and a hub supporting one or more discs, the shaft and the sleeve being supported for relative rotation by a fluid dynamic bearing, the fluid dynamic bearing supporting a sleeve and shaft for relative rotation, the shaft having a pair of cones separated along the shaft, the sleeve comprising a pair of bearing seats, one of the seats cooperating with of the cones to define a gap between the cone and the seat, fluid in the gap supporting the sleeve and shaft for relative rotation, and a region of low thermal conductivity on an outer surface of the sleeve for providing thermal insulation for the shaft and the sleeve to keep the fluid dynamic bearing warm even a low temperature environment.

10. A fluid dynamic bearing as claimed in claim 9 wherein the region of low thermal conductivity comprises a circumferential ceramic layer.

11. A fluid dynamic bearing as claimed in claim 9 wherein the sleeve comprises stainless steel and the shaft comprises stainless steel.

12. A fluid dynamic bearing as claimed in claim 9 wherein the thermal insulating region comprises an air gap extending radially and axially along an outer surface of the sleeve.

13. A fluid dynamic bearing as claimed in claim 12 wherein the air gap extends axially along a region between the bearing seats and cones, but not radially overlapping the region of the bearing seats and cones.

14. A fluid dynamic bearing as claimed in claim 12 wherein the bearing seat comprises stainless steel, and the hub comprises aluminum.

15. A fluid dynamic bearing as claimed in claim 9 wherein the region of low thermal conductivity comprises a cylindrical shield comprising engineering plastic.

16. In a disc drive comprising a housing and a base, and a spindle motor supporting at least one disc for rotation, the motor comprising hydrodynamic bearing means comprising fluid for supporting the disc for rotation, and means for thermally insulating the fluid bearing from the surrounding environment.

17. A disc drive as claimed in claim 16 wherein the means for insulating comprises a circumferential insulating layer radially intermediate the fluid and the hub.

18. A disc drive as claimed in claim 17 wherein the means for insulating comprises a circumferential ceramic layer.

19. A disc drive as claimed in claim 16 wherein the means for insulating comprises an air gap between a sleeve supporting a motor shaft for rotation and a hub supporting the disc for rotation.

20. A disc drive as claimed in claim 19 wherein the air gap extends along a region between the bearing seats and the cones, but not radially overlapping the region of the bearing seats and the cones.

* * * * *